United States Patent [19]
Yoshida

[11] Patent Number: 5,548,701
[45] Date of Patent: Aug. 20, 1996

[54] CHARACTER PROCESSING METHOD AND APPARATUS

[75] Inventor: Masayuki Yoshida, Yokohama, Japan

[73] Assignee: Canon Kabushiki Kaisha, Tokyo, Japan

[21] Appl. No.: 312,935

[22] Filed: Sep. 30, 1994

Related U.S. Application Data

[63] Continuation of Ser. No. 679,110, Apr. 2, 1991, abandoned.

[30] Foreign Application Priority Data

Apr. 4, 1990 [JP] Japan ................................. 2-89605

[51] Int. Cl.$^6$ .................................................. G06T 11/00
[52] U.S. Cl. ...................... 395/150; 395/110; 395/115; 395/151; 345/194
[58] Field of Search ....................... 395/150, 151, 395/101–117; 345/192–197, 126, 100

[56] References Cited

U.S. PATENT DOCUMENTS

| | | | |
|---|---|---|---|
| 4,757,551 | 7/1988 | Kobayashi et al. | 383/18 |
| 4,827,358 | 5/1989 | Matsumoto | 358/296 |
| 4,831,368 | 5/1989 | Masimo et al. | 340/720 |
| 4,843,593 | 6/1989 | Yamura et al. | 364/900 |
| 5,018,217 | 5/1991 | Yoshida et al. | 382/22 |
| 5,099,435 | 3/1992 | Collins et al. | 395/150 |

FOREIGN PATENT DOCUMENTS

| | | |
|---|---|---|
| 356262 | 2/1980 | European Pat. Off. |
| 16651 | 10/1980 | European Pat. Off. |
| 114253 | 8/1984 | European Pat. Off. |
| 357389 | 3/1990 | European Pat. Off. |

OTHER PUBLICATIONS

Patent Abstracts of Japan, vol. 6159 (Kokai 57-076675) (May 1982).
Patent Abstracts of Japan, vol. 14237 (Kokai 2-063762) (Mar. 1990).
Patent Abstracts of Japan, vol. 14237 (Kokai 2-063762) (Mar. 1990).
Patent Abstracts of Japan, vol. 13 No. 545 (M-902) Dec. 6, 1989 & JP-A-01 226 350 (Canon Inc.) Sep. 11, 1989.

*Primary Examiner*—Almis R. Jankus
*Assistant Examiner*—Joseph H. Feild
*Attorney, Agent, or Firm*—Fitzpatrick, Cella, Harper & Scinto

[57] ABSTRACT

The invention relates to a character processing method and apparatus having a function to convert data of a vector form into data of a dot form. The apparatus converts data of vector form into data of dot form, discriminates a direction for conversion of the data from vector from into dot form on the basis of the size of memory area to store the data after completion of the conversion into dot form and the size of output data. The conversion is controlled as to convert the data of vector form into data of dot form in the direction discriminated.

28 Claims, 7 Drawing Sheets

CHARACTER PROCESSING METHOD AND APPARATUS

This application is a continuation of application Ser. No. 07./679,110, filed Apr. 2, 1991, now abandoned.

BACKGROUND OF THE INVENTION

1. Field of the Invention

The present invention relates to a character processing method and apparatus having a function to convert data of vector form into data of dot form.

2. Related Background Art

Figure 1:
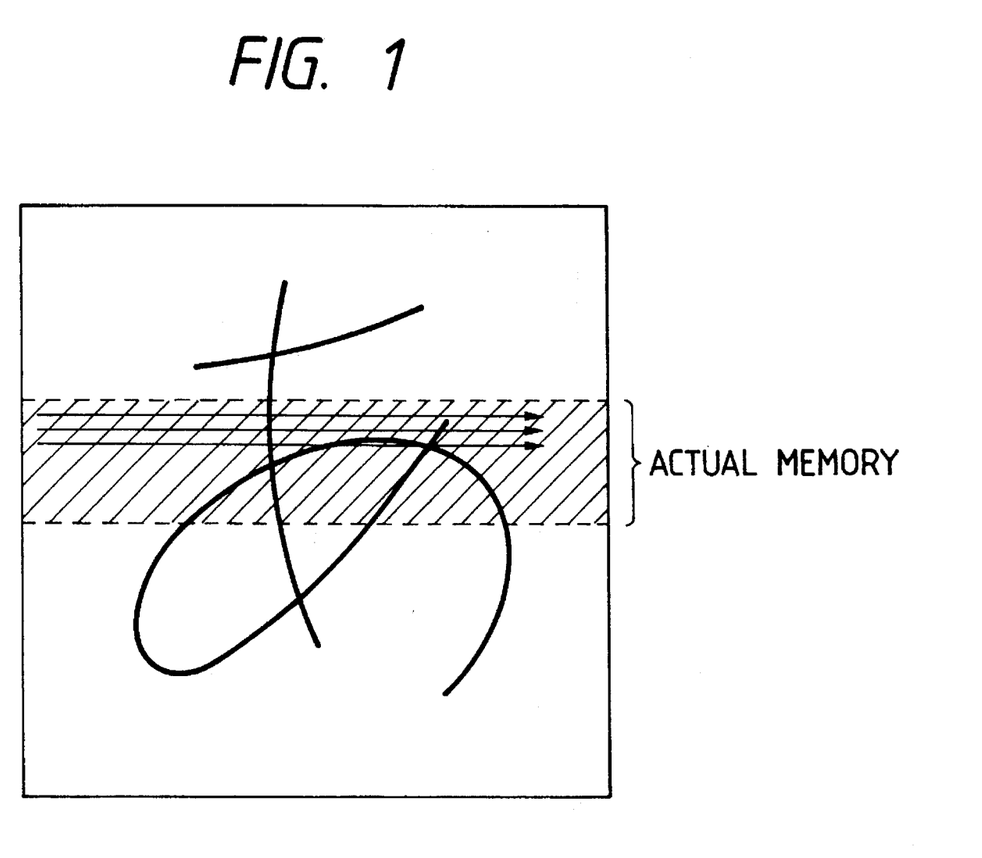
FIG. 1 is a diagram showing a conventional process.

Hitherto, when data of vector form is converted into data of dot form, if there is a limitation on the capacity of a memory as shown in FIG. 1, the data of vector form is converted into the data of the dot form in a row scan direction. When data is transferred to the output side, since the data direction of an output device is set in a column scan direction, a row/column scan conversion is executed and the data is generated for output.

However, there is a problem that it takes time to execute the row/column scan converting process, so that the overall processing time increases.

SUMMARY OF THE INVENTION

It is an object of the invention to provide a character processing method and apparatus which can properly control processes for converting and developing data of vector form into data of dot form on the basis of a size of the development area and the scan direction of an output section.

To solve the above problems, the invention intends to provide a character processing method and apparatus in which on the basis of the size of data to be developed and the size of memory area which can be developed for instance, if one entire character can be stored in the memory which can be developed, data of vector form is converted into data of dot form in a direction according to a scan direction of an output device, and if one entire character cannot be stored in the memory which can be developed, the data of the vector form is converted into data of the dot form by a row scan method, so that the character can be generated at a high speed with respect to the data of the dot form which can be stored in the memory area which can be developed.

DETAILED DESCRIPTION OF THE PREFERRED EMBODIMENTS

The embodiment of the invention will be described with reference to the drawings. The invention can be applied to a system comprising a plurality of apparatuses, a system comprising a single apparatus, or the case where it is accomplished by supplying a program to a system or an apparatus i.e., implemented by software rather than by hardware above.

Figure 2:
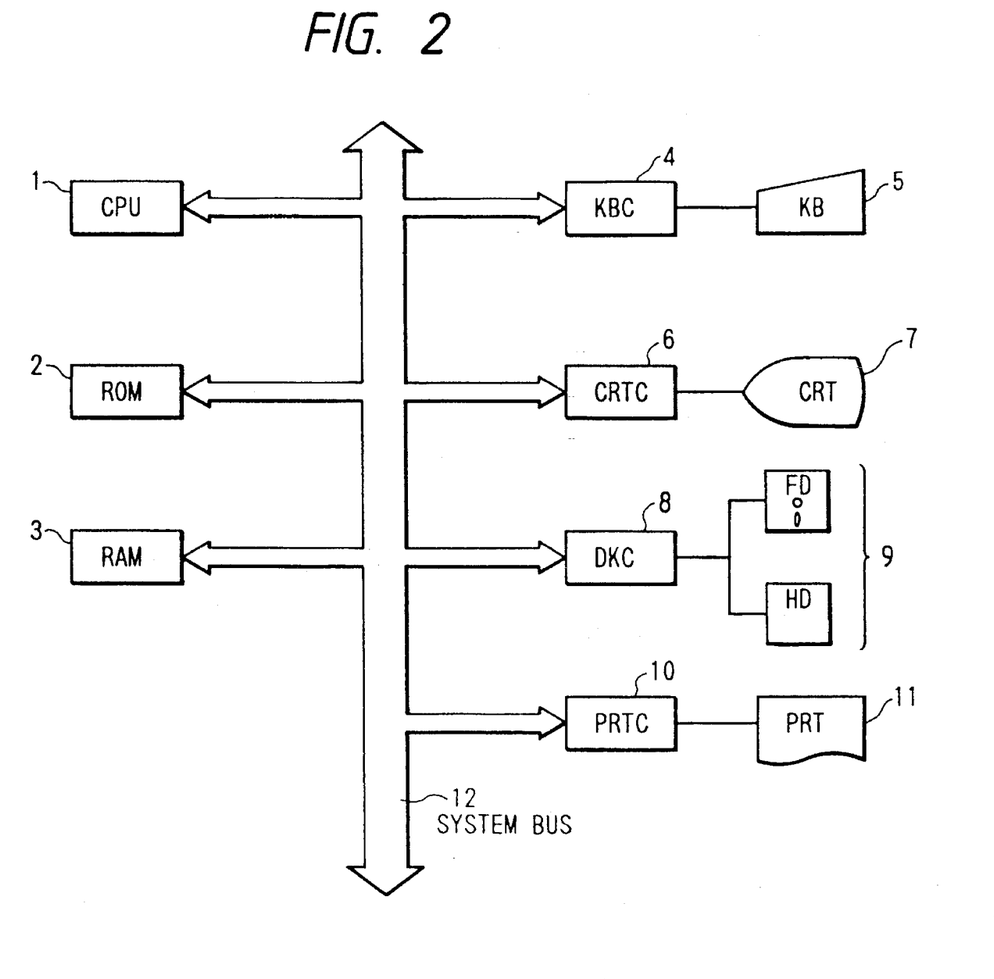
FIG. 2 is a block diagram showing an internal construction of the invention.

FIG. 2 is a block diagram showing a fundamental construction of a Japanese word processor according to the invention. In FIG. 2, reference numeral 1 denotes a central processing unit (CPU) for executing control processes, arithmetic operating processes, and the like of the whole apparatus; 2 a read only memory (ROM) serving as a memory area to store programs shown in flowcharts, which will be explained hereinbelow, a system actuation program, character patterns and data, and the like; 3 a random access memory (RAM) serving as a data memory area which has no use limitation and in which the programs and data are stored in the course of the various processes; 4 a keyboard control section (KBC) for receiving key input data from a keyboard (KB) 5 and transferring it to the CPU 1; 6 a display control section (CRTC); 7 a display device (CRT) for receiving data from the CRTC 6 and displaying it; and 9 an external memory device such as a floppy disk device (FD), hard disk device (HD), or the like. The programs and data have previously been stored in the external memory device 9 and are referred or loaded into the RAM as necessary upon execution. Reference numeral 8 denotes a disk control section (DKC) to control a data transmission or the like; 10 a printer control section (PRTC); 11 a printer (PRT) constructed by a dot printer such as laser beam printer, bubble jet printer, or the like; and 12 a system bus serving as a path of data among the above component elements.

The operation of the embodiment with the above construction will now be described with reference to a flowchart of FIG. 3 and FIG. 4 as an example.

Figure 3:
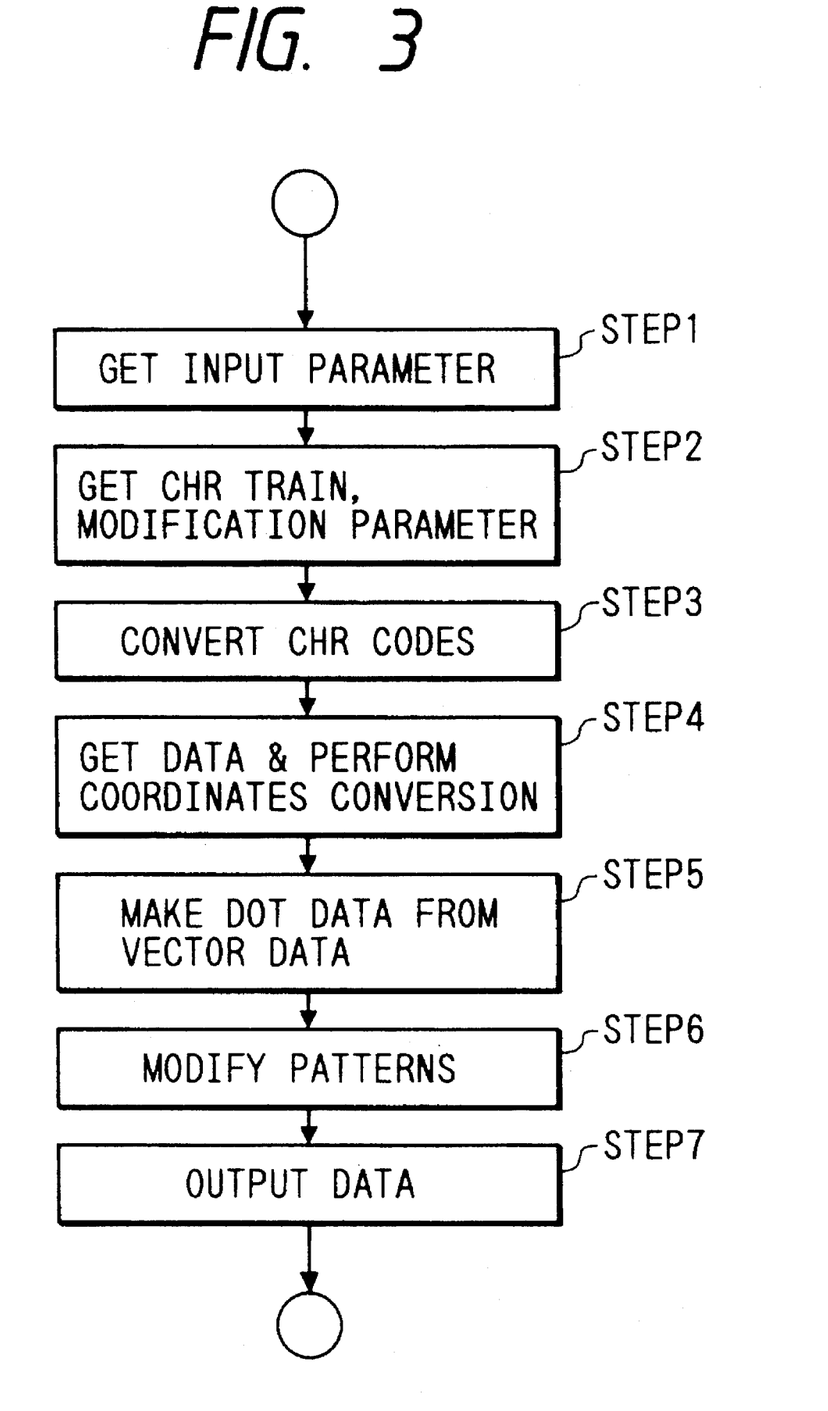
FIG. 3 is a flowchart showing the overall flow of the invention.

In step 1 in FIG. 3, information which is transferred from the output section side is fetched as input parameters.

As parameters which are transferred from the output section side, there are the size of the whole output area, the information scan direction of an actual output area, and the like. The scan direction is set to the row direction in the case where a laser beam printer or a full line type bubble jet printer or thermal copy transfer printer is used as an output section. The scan direction is set to the column direction in the case where a bubble jet printer or a thermal copy transfer printer of the serial type comprising 60 dots or the like in the vertical direction is used as an output section.

Figure 4:
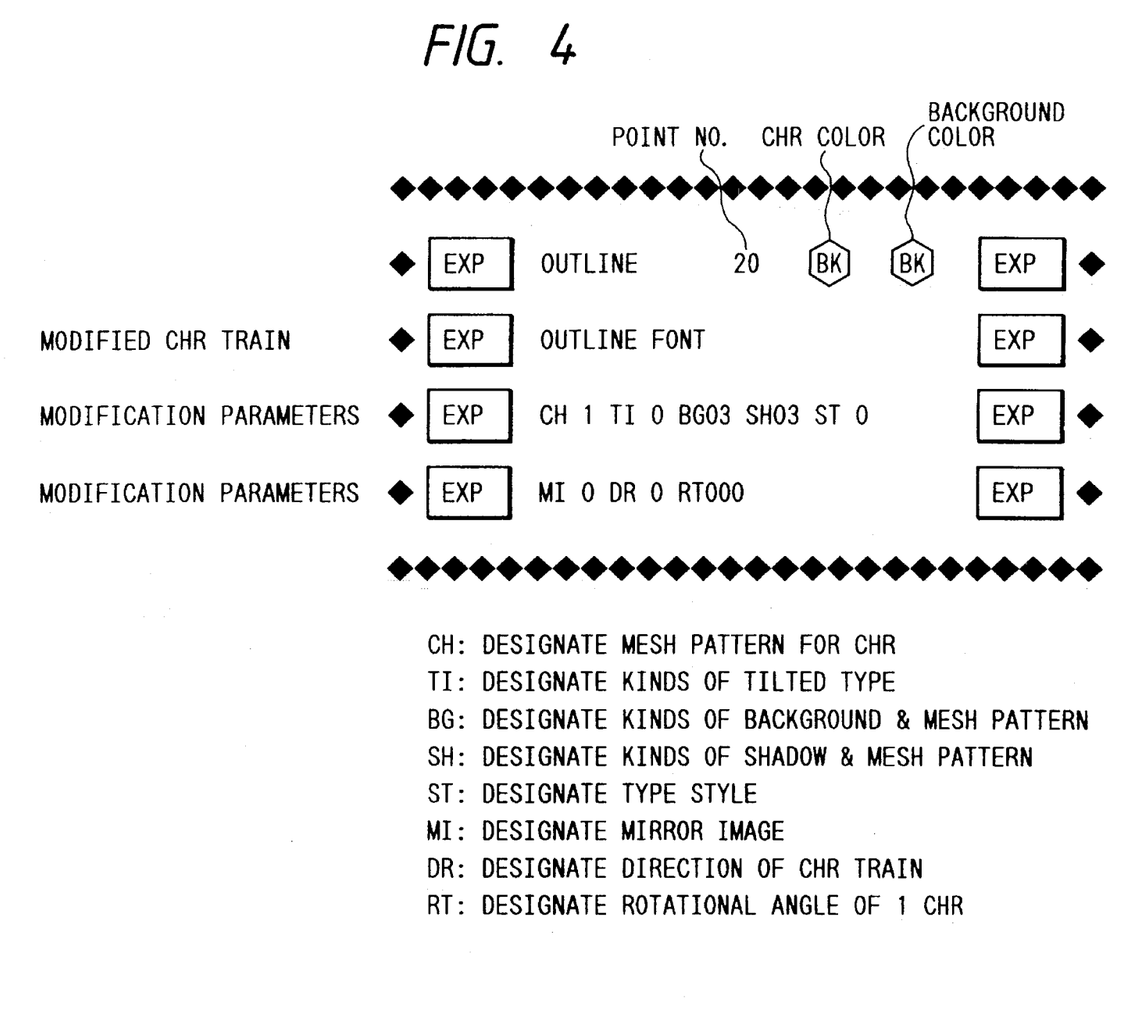
FIG. 4 shows an area assembled on a document screen.

In step 2, there are executed processes to read information such as point number (number of points to indicate character size), character train, kind of modification, and the like which have been written in an area which is assembled on a document screen as shown in FIG. 4 and into which data of a dot form obtained by converting the data of a vector form is stored. Any one of ruled lines, a table, a box, and the like can be used as such area in this embodiment.

In step 3, only the necessary data in a character train to be developed is not changed. The unnecessary data is replaced by space codes.

In step 4, the character code train after completion of the conversion in step 3 is referred and if it is determined that the character codes are codes other than space codes, the data of the vector form and the point attributes of a straight line/curve corresponding to the codes are read and stored in the memory device, and the conversion of the x and y coordinate values as data of the vector form is executed in accordance with the character size and the kind of modification which have been read in step 2. If the character codes are space codes, information indicating that no data here has been read is stored into the memory device.

In step 5, data of the dot form is formed on the basis of the x-y coordinate data stored in the memory device in step 4. At this time, the scan direction when the data of the dot form is formed from the data of the vector form is determined on the basis of the size of memory which can be developed and the size of character to be generated. The data is developed in accordance with the scan direction as will be explained in detail hereinbelow.

In step 6, a modification such as to add a mesh or a background to the data is executed to the data converted into dot form on the basis of the modification information which has been In step 7, a necessary portion in the dot form data formed in step 6 is transferred to the memory section on the output side. At this time, if the scan direction in which the data has been formed coincides with that of the scan form on the output side, the data is generated as it is. If it differs, a row/column scan conversion is executed and the resultant data is generated.

Figure 5:
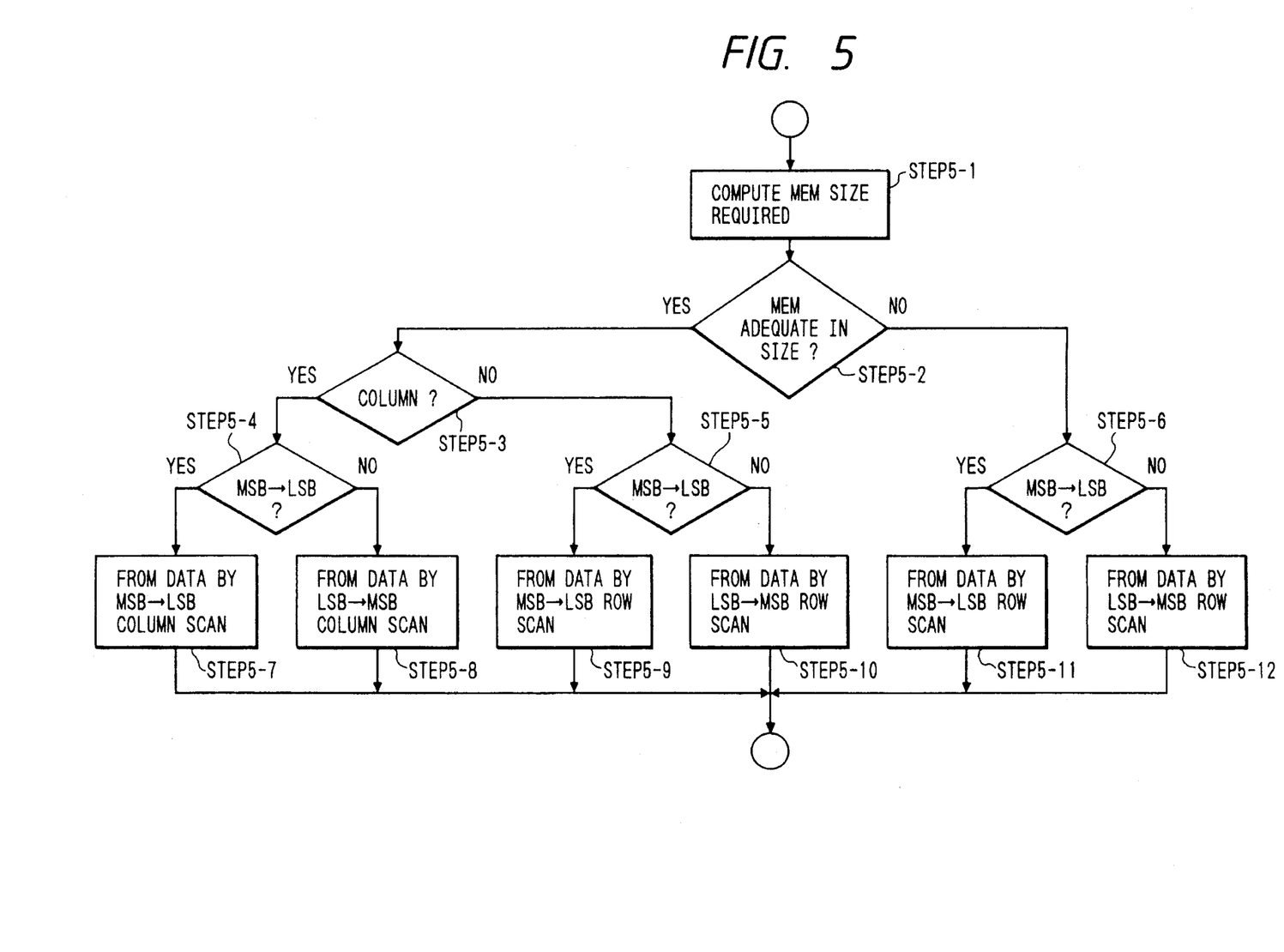
FIG. 5 is a flowchart showing the details of the invention.

FIG. 5 is a flowchart for explaining the process of step 5 in FIG. 3 in detail. In step 5-1 in FIG. 5, a memory size which is needed by one character is calculated from the designated point number which has been fetched in step 2 in FIG. 3. A check is made to see if the calculated memory size is larger or smaller than the size of memory which has been prepared.

In step 5-2, if the calculated memory size which is necessary by one character is smaller than larger, step 5-6 follows.

In step 5-3, the scan direction of the output device fetched in step 1 is checked. If the scan direction of the output device is set to the column direction, step 5-4 follows. If it is set to the row direction, step 5-5 follows.

In step 5-4, a check is made to see in which direction in the column scan the MSB/LSB of the data of one byte is located. If it is located in the direction from the MSB to the LSB, step 5-7 follows. If it is located in the direction from the LSB to the MSB, step 5-8 follows.

In step 5-5, a positional relation between the MSB and the LSB is discriminated in the case of processing in the row scan direction when one character can be completely stored in the work memory. If it is set to the direction from the MSB to the LSB, step 5-9 follows. If it is set to the direction from the LSB to the MSB, step 5-10 follows.

Step 5-6 relates to a process which is executed when it is determined in step 5-2 that one character cannot be fully stored in the work memory. In step 5-6, the entire character is processed in the row direction and a positional relation between the MSB and the LSB in the row direction is discriminated. If it is set to the direction from the MSB to the LSB, step 5-11 follows. If it is set to the direction from the LSB to the MSB, step 5-12 follows.

Figure 6A:
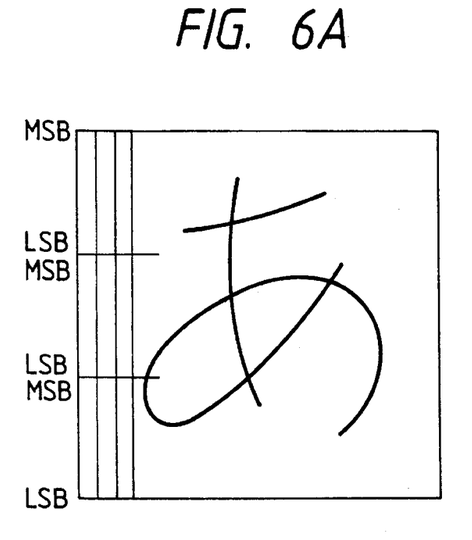
FIGS. 6A to 6F are diagrams showing the details of processes of the invention.

In step 5-7, as shown in FIG. 6A, data of one entire character is formed by the column scan in the direction from the MSB to the LSB.

Figure 6B:
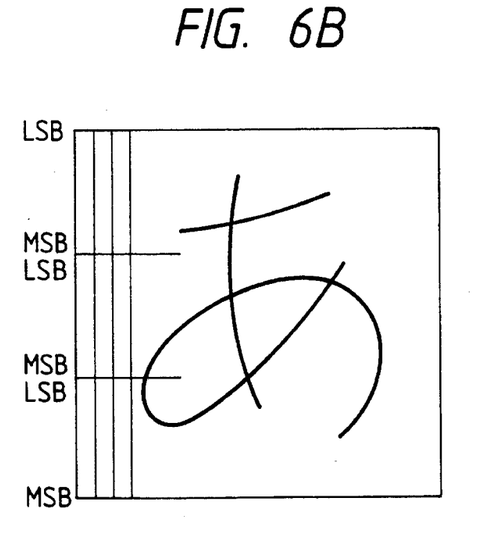

In step 5-8, as shown in FIG. 6B, data of one entire character is formed by the column scan in the direction from the LSB to the MSB.

Figure 6C:
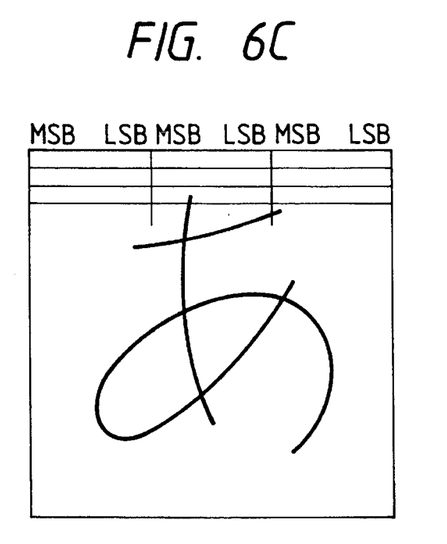

In step 5-9, as shown in FIG. 6C, data of one entire character is formed by the row scan in the direction from the MSB to the LSB.

Figure 6D:
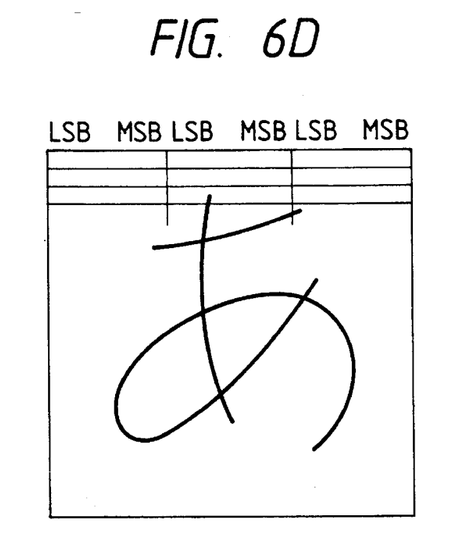

In step 5-10, as shown in FIG. 6D, data of one entire character is formed by the row scan in the direction from the LSB to the MSB.

Figure 6E:
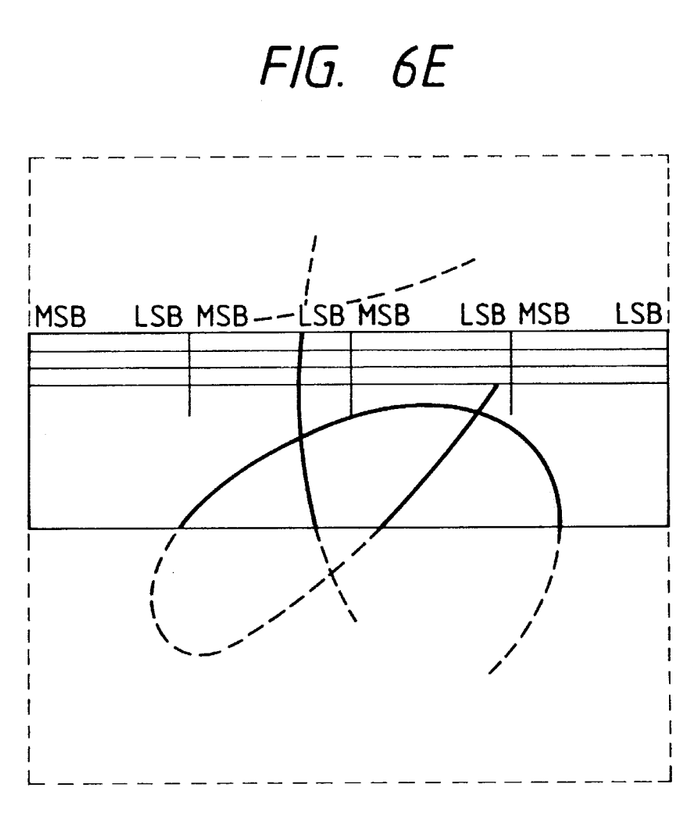

In step 5-11, since data of one entire character cannot be formed in a lump, as shown in FIG. 6E, a part of one character is divided and the data in the divided area is formed by the row scan in the direction from the MSB to the LSB.

Figure 6F:
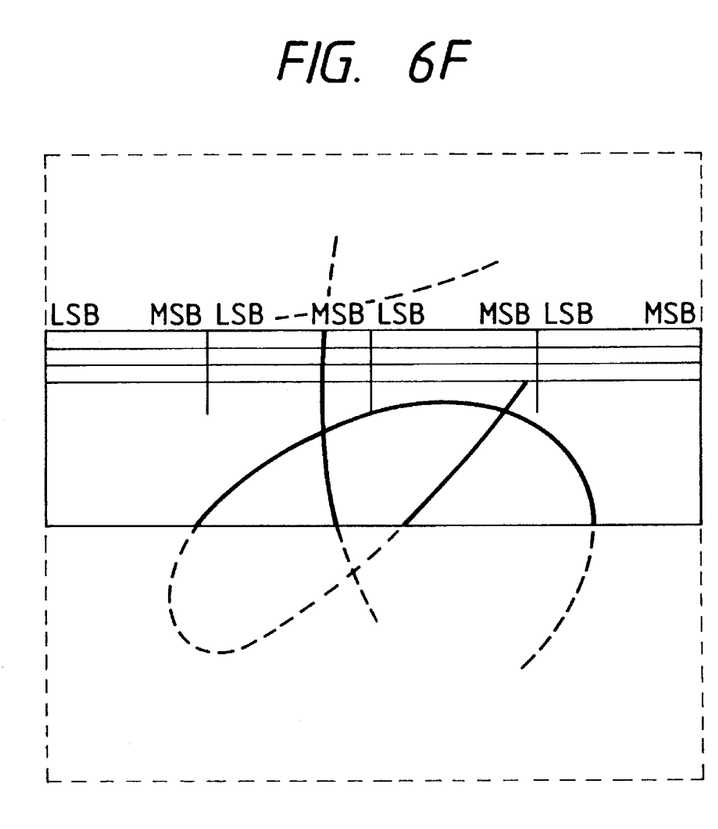

In step 5-12, since data of one entire character cannot be formed in a lump, as shown in FIG. 6F, a part of one character is divided and the data in the divided area is formed by the row scan in the direction from the LSB to the MSB.

As mentioned above, data can be generated at a high speed by changing a method of converting the data of vector form into data of dot form on the basis of the size of memory which has been prepared and the size of character to be generated.

As described in detail above, it is possible to properly control processes such that the data of vector form is converted into data of dot form and is developed on the basis of the size of development area which has been prepared and the scan direction of the output section and a character processing apparatus can be provided.

What is claimed is:

1. A character processing apparatus to which output apparatuses of different scanning types can be connected, said character processing apparatus comprising:

generating means for generating dot form data in accordance with vector form data, said generating means being constructed to be able to generate the dot form data using, selectively, either a first process, in which the dot form data is generated in a first direction, or a second process, in which the dot form data is generated in a second direction;

memory means for storing the generated dot form data; and discriminating means for discriminating the scanning type of an output apparatus connected to said character processing apparatus, wherein said generating means generates the dot form data using the first or the second process, respectively, in accordance with a discrimination result produced by said discriminating means, such that the dot form data is generated in a direction corresponding to the scanning type of the connected output apparatus discriminated by said discriminating means.

2. An apparatus according to claim 1, further comprising means for outputting the dot form data stored in said memory means.

3. An apparatus according to claim 2, wherein said output means comprises a laser beam printer.

4. An apparatus according to claim 2, wherein said output means comprises a full line type ink jet printer.

5. An apparatus according to claim 2, wherein said output means comprises a serial type ink jet printer.

6. An apparatus according to claim 2, wherein said output means comprises a thermal printer.

7. An apparatus according to claim 1, further comprising a second discriminating means, said second means discriminating whether the dot form data generated by said generating means can be stored by a character unit upon storage into said memory means, wherein a portion of the dot form data is divided into parts and stored if said second discriminating means discriminates that the dot form data cannot be stored by a character unit.

8. A character processing apparatus according to claim 1, wherein, if the discriminated scanning type is a column scanning type, said generating means generates the dot form data in a column direction, and if the discriminated scanning type is a row scanning type, said generating means generates the dot form data in a row direction.

9. A character processing apparatus according to claim 1, wherein said discriminating means discriminates the scanning type of an output apparatus connected on the basis of information indicative of the scanning direction of the output apparatus received from the output apparatus.

10. A character processing apparatus to which output apparatuses of different scanning types can be connected, said character processing apparatus comprising:

generating means for generating dot form data in accordance with vector form data;

memory means for storing the generated dot form data;

discriminating means for discriminating whether an output apparatus connected to said character processing apparatus is of a column-direction scanning type or a row-direction scanning type; and determining means for determining whether one character of dot form data to be generated can be accommodated in a predetermined memory area, wherein, in the event that said determining means determines that the one character of the dot form data to be generated cannot be accommodated in the predetermined memory area, said generating means generates the dot form data in a row direction even if said discriminating means discriminates that the connected output apparatus is of the column direction scanning type.

11. A character processing apparatus according to claim 10, wherein, in the event that said determining means determines that the one character of the dot form data to be generated can be accommodated in the predetermined memory area, said generating means generates the dot form data in a direction corresponding to the scanning type of the connected output apparatus discriminated by said discriminating means.

12. A character processing apparatus according to claim 11, further comprising output means for outputting the dot form data stored in said memory means.

13. A character processing apparatus according to claim 10, further comprising output means for outputting the dot form data stored in said memory means.

14. A character processing apparatus according to claim 10, wherein, in the event that said determining means determines that the one character of the dot form data to be generated cannot be accommodated in the predetermined memory area, said generating means generates the dot form data by dividing the dot form data into groups.

15. A character processing method for use in a character processing apparatus to which output apparatuses of different scanning types can be connected, said character processing method comprising the steps of:

generating dot form data in accordance with vector form data, said generating step being performed using, selectively, either a first process, in which the dot form data is generated in a first direction, or a second process, in which the dot form data is generated in a second direction;

storing the generated dot form data; and discriminating the scanning type of an output apparatus connected to the character processing apparatus, wherein said generating step is performed using the first or the second process, respectively, in accordance with a discrimination result produced in said discriminating step, such that the dot form data is generated in a direction corresponding to the scanning type of the connected output apparatus discriminated in said discriminating step.

16. A method according to claim 15, further comprising the step of outputting the dot form data stored in said storing step.

17. A method according to claim 16, wherein said outputting step is performed using a laser beam printer.

18. A method according to claim 16, wherein said outputting step is performed using a full line type ink jet printer.

19. A method according to claim 16, wherein said outputting step is performed using a serial type ink jet printer.

20. A method according to claim 16, wherein said outputting step is performed using a thermal printer.

21. A method according to claim 15, further comprising a second discriminating step, wherein a discrimination is made as to whether the dot form data generated in said generating step can be stored by a character unit upon storage in said storing step, wherein a portion of the dot form data is divided into parts and stored if it is discriminated in said second discriminating step that the dot form data cannot be stored by a character unit.

22. A character processing method according to claim 15, wherein, if the discriminated scanning type is a column scanning type, the dot form data is generated in a column direction, and if the discriminated scanning type is a row scanning type, the dot form data is generated in a row direction.

23. A character processing method according to claim 15, wherein, in said discriminating step, the scanning type of a connected output apparatus is discriminated on the basis of information indicative of the scanning direction of the output apparatus received from the output apparatus.

24. A character processing method for use in a character processing apparatus to which output apparatuses of different scanning types can be connected, said character processing method comprising the steps of:

generating dot form data in accordance with vector form data;

storing the generated dot form data;

discriminating whether an output apparatus connected to the character processing apparatus is of a column-direction scanning type or a row-direction scanning type; and determining whether one character of dot form data to be generated can be accommodated in a predetermined memory area, wherein, in the event that it is determined in said determining step that the one character of the dot form data to be generated cannot be accommodated in the predetermined memory area, the dot form data is generated in a row direction even if it is discriminated in said discriminating step that the connected output apparatus is of the column direction scanning type.

25. A character processing method according to claim 24, wherein, in the event that it is determined in said determining step that the one character of the dot form data to be generated can be accommodated in the predetermined memory area, the dot form data is generated in a direction corresponding to the scanning type of the connected output apparatus discriminated in said discriminating step.

26. A character processing method according to claim 25, further comprising the step of outputting the dot form data stored in said storing step.

27. A character processing method according to claim 24, further comprising the step of outputting the dot form data stored in said storing step.

28. A character processing method according to claim 24, wherein, in the event that it is determined in said determining step that the one character of the dot form data to be generated cannot be accommodated in the predetermined memory area, the dot form data is generated by dividing the dot form data into group.

* * * * *

UNITED STATES PATENT AND TRADEMARK OFFICE
CERTIFICATE OF CORRECTION

PATENT NO. : 5,548,701
DATED : August 20, 1996
INVENTOR(S) : MASAYUKI YOSHIDA

It is certified that error appears in the above-identified patent and that said Letters Patent is hereby corrected as shown below:

ON THE TITLE PAGE

In [56] References Cited under U.S. PATENT DOCUMENTS:

"Yamura" should read --Yamaru--.

Under OTHER PUBLICATIONS:

"Patent Abstracts Of Japan Vol. 14237 (Kokai 2-063762) (Mar. 1990)." (second occurrence) should be deleted.

COLUMN 1

Line 64, "embodiment" should read --preferred embodiment--.

COLUMN 2

Line 2,  "i.e.," should read --(i.e.,--;
Line 3,  "above." should read --above).--;
Line 26, "bubble" should read --ink--;
Line 39, "bubble" should read --ink--;
Line 42, "a bubble" should read --an ink--;

UNITED STATES PATENT AND TRADEMARK OFFICE
CERTIFICATE OF CORRECTION

PATENT NO. : 5,548,701
DATED : August 20, 1996
INVENTOR(S) : MASAYUKI YOSHIDA

It is certified that error appears in the above-identified patent and that said Letters Patent is hereby corrected as shown below:

COLUMN 3

Line 11,   "been" should read --been read in step 2.--;
Line 26,   "than" should read --than the prepared memory size, step 5-3 follows. If it is--.

COLUMN 6

Line 64,   "group." should read --groups.--.

Signed and Sealed this

Twenty-first Day of January, 1997

Attest:

BRUCE LEHMAN

Attesting Officer      Commissioner of Patents and Trademarks